United States Patent [19]

Benner et al.

[11] Patent Number: 4,568,532
[45] Date of Patent: Feb. 4, 1986

[54] SUPPLEMENTAL AMMONIA SYNTHESIS

[75] Inventors: Gereld S. Benner, Katy; Joseph R. Le Blanc, Houston; Jing M. Lee, Stafford; Harry P. Leftin, Houston; Philip J. Shires, Katy; Christiaan P. van Dijk, Houston, all of Tex.

[73] Assignee: The M. W. Kellogg Company, Houston, Tex.

[21] Appl. No.: 661,482

[22] Filed: Oct. 16, 1984

[51] Int. Cl.[4] .................................................. C01C 1/04
[52] U.S. Cl. ..................................... 423/361; 423/359
[58] Field of Search ................ 423/359, 360, 361, 362

[56] References Cited

U.S. PATENT DOCUMENTS

| 1,931,678 | 10/1933 | Porter | 423/361 |
|---|---|---|---|
| 3,002,816 | 10/1961 | Friend et al. | 423/361 |
| 3,388,968 | 6/1968 | Spielman et al. | 23/199 |
| 3,395,982 | 8/1968 | Didycz | 23/199 |
| 3,851,046 | 11/1974 | Wright et al. | 423/359 |
| 4,058,589 | 11/1977 | Haslam | 423/359 |
| 4,181,701 | 1/1980 | Topsoe | 422/158 |
| 4,250,057 | 2/1981 | Foster et al. | 252/447 |
| 4,271,136 | 6/1981 | Tennison | 423/363 |
| 4,312,851 | 1/1982 | Isalski et al. | 423/359 |
| 4,383,982 | 5/1983 | Pinto | 423/359 |
| 4,409,196 | 10/1983 | Skinner et al. | 423/359 |
| 4,479,925 | 10/1984 | Shires et al. | 423/359 |
| 4,524,056 | 6/1985 | Banquy | 423/359 |

FOREIGN PATENT DOCUMENTS

| 82691 | 7/1978 | Japan | 423/359 |
|---|---|---|---|
| 1136040 | 12/1968 | United Kingdom | 423/359 |
| 1274504 | 5/1972 | United Kingdom | 423/359 |
| 2039858 | 8/1980 | United Kingdom | 423/359 |

Primary Examiner—John Doll
Assistant Examiner—Wayne A. Langel

[57] ABSTRACT

Ammonia synthesis gas is partially converted over iron-based synthesis catalyst, cooled, and further converted over a more active synthesis catalyst.

4 Claims, 1 Drawing Figure

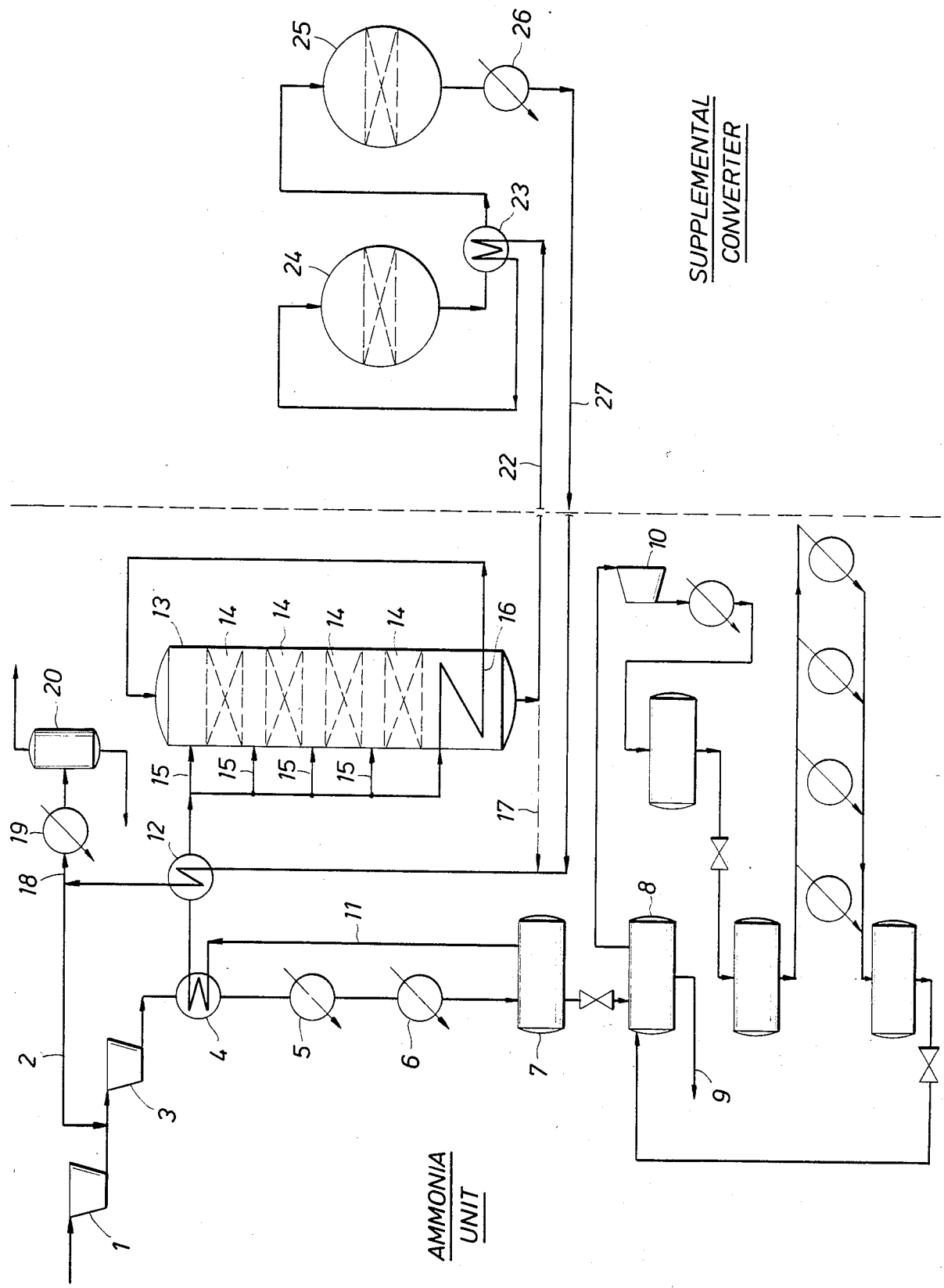

SUPPLEMENTAL AMMONIA SYNTHESIS

This invention relates to ammonia production and to supplemental conversion of ammonia synthesis gas.

For many years, commercial production of ammonia has been carried out in large, single-train plants which employ the sequential process steps of primary endothermic steam reforming, secondary exothermic steam reforming with air, shift conversion of carbon monoxide to hydrogen and carbon dioxide, carbon dioxide removal, and residual carbon oxide conversion to produce fresh ammonia synthesis gas in close to the stoichiometric hydrogen to nitrogen molar ratio (hereinafter sometimes referred to as H/N ratio) of three moles hydrogen and one mole nitrogen plus much smaller amounts of inert gases, predominantly methane and argon. In these single-train plants, the fresh synthesis gas is centrifugally compressed to a synthesis pressure generally between 105 and 280 kg/cm$^2$ and combined in a synthesis loop with centrifugally recompressed recycle gas from an ammonia conversion system. The conversion system is usually a single, high pressure, high temperature reactor having several beds of predominantly iron catalyst and is equipped with direct or indirect heat exchange means for removing exothermic heat of synthesis. Only partial conversion of the combined synthesis gas takes place in a single pass through the conversion system in which the ammonia content of the combined synthesis gas typically increases from between 1 and 4 volume percent at the converter inlet to between 10 and 18 volume percent at the converter outlet. A purge gas stream is removed from the synthesis loop following ammonia recovery but preceding introduction of fresh synthesis gas to prevent excessive accumulation of inert gases.

As recited, ammonia converters typically have several beds of iron catalyst with incremental conversion occurring in each of the beds until the target ammonia concentration at converter outlet is attained. The target ammonia concentration is one of many variables considered by the designer in setting operating conditions for the synthesis loop. Inert gas concentration in the synthesis loop is a principal variable that is closely related to ammonia concentration because of its adverse effect on reaction equilibrium. As a practical matter, therefore, employment of more than three or four catalyst beds to obtain marginal increase in ammonia concentration against the adverse equilibrium effect of inert gas concentration brings little more than the uneconomic result of increased pressure drop and higher recycle gas compression cost in the synthesis loop.

We have found, however, that significant economies in both recycle gas and refrigeration compression requirements can be obtained by supplemental conversion of converted gas from an iron bed synthesis reactor over a more active synthesis catalyst.

According to the invention, a first converted gas is produced in an ammonia synthesis loop by combining fresh ammonia synthesis gas with a recycle gas to provide a combined synthesis gas which is then partially reacted over ammonia synthesis catalyst containing iron. The resulting first converted gas having an ammonia concentration between 10 and 18 volume percent is cooled to between 315° C. and 370° C. and then further reacted over more active ammonia synthesis catalyst comprising a platinum group metal supported on graphite-containing carbon to provide a second converted gas having an ammonia concentration between 13 and 24 volume percent. Since the catalyst employed in supplemental conversion is highly active at less than the stoichiometric molar ratio for ammonia synthesis, we prefer to adjust the hydrogen to nitrogen molar ratio (sometimes hereinafter referred to as H/N ratio) of the fresh synthesis gas to a slight excess of nitrogen and sharply reduce the flow of recycle gas. As later described, this permits operation of the iron catalyst converter at nearly stoichiometric H/N ratio and operation of the supplemental converter employing the more active catalyst with a substantial stoichiometric excess of nitrogen.

The drawing is a schematic flow diagram of a conventional ammonia synthesis plant modified with a supplemental conversion system in accordance with the invention.

In a preferred embodiment of the invention, the H/N ratio of the fresh ammonia synthesis gas is adjusted to between 2.80 and 2.98 by known means and flow of recycle gas to the iron bed converter is reduced in an amount sufficient to provide an H/N ratio in the first converted gas at the outlet of the iron bed converter between 2.2 and 2.8. The amount of recycle gas employed will depend upon characteristics of the existing plant and the specific objectives of supplemental conversion. Typically, the principal objective is savings in power consumption by the recycle gas compressor and refrigeration compressor. Accordingly, the recycle gas flow may be reduced such that the volumetric flow rate ratio of recycle gas to fresh synthesis gas declines, for example, from a value between 4 and 6 to a value between 2 and 4. Correspondingly, the H/N ratio of combined gas to the main converter may be reduced from a value of 3 to, for example, 2.5 to 2.8. As noted above, the first converted gas will have a lower H/N ratio owing to synthesis of ammonia from three moles of hydrogen per mole of nitrogen.

Preferably, the more active synthesis catalyst in the supplemental conversion system is ruthenium supported on graphite-containing carbon more fully described in U.S. Pat. No. 4,250,057. A single, supplemental reactor of, for example, hot wall design and having a single catalyst bed will usually be sufficient to obtain the desired increase in final ammonia concentration in the second converted gas leaving the supplemental synthesis system. When very high conversions are desired in the supplemental system, we prefer to use two reactors containing the highly active catalyst with intermediate cooling of the partially converted gas.

The process of the invention is suitable for application to ammonia plants having either high or low pressure synthesis loops. In the instance of low pressure loops operating between 100 kg/cm$^2$ and 160 kg/cm$^2$, we prefer to employ supplemental conversion to an ammonia concentration in the second converted gas between 13 and 18 volume percent. In the instance of high pressure loops operating between 160 kg/cm$^2$ and 220 kg/cm$^2$, equilibrium conditions for ammonia synthesis are more favorable and we prefer to employ supplemental conversion to an ammonia concentration in the second converted gas between 15 and 24 volume percent. In any event, we prefer to operate the supplemental conversion system employing the more active catalyst at a pressure not greater than that of the main converter to avoid the need for an intermediate compressor.

Referring now to the drawing, the left portion of the drawing schematically illustrates the synthesis section of a representative, existing, nominal 1000 metric tons per day ammonia plant. The description immediately following pertains to operation of that synthesis section prior to addition of a supplemental conversion system in accordance with the invention.

Fresh synthesis gas containing hydrogen and nitrogen in a 3:1 molar ratio and an argon plus methane concentration of 1.3 volume percent is introduced to make-up gas compressor 1 where it is compressed to 140 kg/cm$^2$ and then combined with recycle gas from line 2 containing 12 volume percent ammonia in addition to unreacted hydrogen and nitrogen and inert gases mentioned. The resulting combined synthesis gas is further compressed to 148 kg/cm$^2$ in recycle compressor 3 and cooled to −23° C. in exchanger 4 and ammonia chillers 5 and 6. Liquid ammonia is separated from the combined gas in separator 7. Inert gases are released from the liquid ammonia in a medium pressure separator (not shown) and combined with purge gas later described. Liquid ammonia is further expanded into the low pressure separator 8 to atmospheric pressure and a temperature of −28° C. Product ammonia is recovered via line 9 and ammonia vapor from separator 8 is compressed in refrigeration compressor 10 which is part of the refrigeration system shown in the lower part of the drawing. The refrigeration system is conventional and not further described here except to state that it provides low temperature chilling service for various parts of the process.

Combined gas now lean in ammonia leaves separator 7 via line 11 and is reheated in exchanger 4 and feed-effluent exchanger 12 for introduction to ammonia converter 13. The ammonia converter is of the quench type wherein heat of reaction in the iron catalyst beds 14 is controlled by introduction of cool quench gas 15 between the beds. The main portion of the combined gas is heated to synthesis temperature in feed-effluent exchanger 16 mounted within the converter. Converted gas in line 17 is cooled to 43° C. in feed-effluent exchanger 12 and the stream is then divided to form recycle stream 2 and purge stream 18. The purge stream is 1.7 volume percent of the converted gas and is taken to control the level of argon plus methane in the synthesis loop at 13.6 volume percent. Since the purge stream contains ammonia, the stream is cooled in ammonia chiller 19 and additional product ammonia is recovered from separator 20. The uncondensed purge gas containing hydrogen, nitrogen, and inert gases is removed from separator 20 via line 21 and utilized as fuel gas in production of the fresh synthesis gas.

When, in accordance with the invention, the ammonia plant is modified for energy savings with a supplemental conversion system shown on the right portion of the drawing, line 17 is deleted and effluent from converter 13 is directed via line 22 to feed-effluent exchanger 23, ammonia converter 24, the hot side of feed-effluent exchanger 23, ammonia converter 25, ammonia chiller 26, and is returned via line 27 to the original synthesis loop. Converters 24 and 25 are hot wall, spherical reactors having a top inlet, bottom outlet, and a gas diffuser for uniform distribution of reactant gas over a thin bed of ruthenium catalyst supported on graphite-containing carbon.

Operationally, the H/N ratio of the fresh synthesis gas to make-up gas compressor 1 is reduced from 3 to 2.95. Since ammonia synthesis occurs with an H/N ratio of 3 and no fresh synthesis gas is added during synthesis, the H/N ratio of converted gas declines to a value of 2.6 at the outlet of converter 13 and a value of 2.4 at the outlet of converter 24 which conditions are suitable for operation of the supplemental converters at 140 kg/cm$^2$ and respective inlet temperatures of 349° C. and 382° C.

Add-on converters 24 and 25 provide additional conversion from an ammonia concentration of 11 volume percent at the outlet of converter 13 to 18 volume percent at the outlet of converter 25. Since, however, these converters maintain the same total ammonia production but use a relatively low gas flow rate, the gas flow rate at the main converter outlet is reduced from 25,410 kg-moles per hour to 14,970 kg-moles per hour. Accordingly, less gas is compressed in recycle compressor 3 and refrigeration compression requirements are reduced by increased use of water cooling for ammonia recovery now possible from higher ammonia concentration in the second converted gas.

We claim:

1. In a process for producing ammonia in a synthesis loop wherein fresh ammonia synthesis gas containing hydrogen, nitrogen, and lesser amounts of argon and methane is combined with a recycle gas to provide a combined synthesis gas, a portion of the combined synthesis gas is reacted over ammonia synthesis catalyst containing iron to provide a first converted gas having an ammonia concentration between 10 and 18 volume percent, a purge stream is removed from the synthesis loop to leave the recycle gas, and ammonia is recovered from the synthesis loop, the improvement which comprises:
    (a) cooling the first converted gas to a temperature between 315° C. and 370° C. and further reacting a portion of the cooled gas over ammonia synthesis catalyst comprising a platinum group metal supported on graphite-containing carbon to provide a second converted gas having an ammonia concentration between 13 and 24 volume percent; and
    (b) adjusting the hydrogen to nitrogen molar ratio of the fresh ammonia synthesis gas to between 2.80 and 2.98 to provide a hydrogen to nitrogen molar ratio in the first converted gas between 2.2 and 2.8.

2. The process of claim 1 wherein the first converted gas is at a pressure between 100 kg/cm$^2$ and 160 kg/cm$^2$ and the second converted gas has an ammonia concentration between 13 and 18 volume percent.

3. The process of claim 1 wherein the first converted gas is at a pressure between 160 kg/cm$^2$ and 220 kg/cm$^2$ and the second converted gas has an ammonia concentration between 15 and 24 volume percent.

4. The process of claim 1 wherein the platinum group metal is ruthenium.

* * * * *